United States Patent
Tanaka (10) Patent No.: US 8,770,819 B2
(45) Date of Patent: Jul. 8, 2014

(54) SURFACE LIGHT-EMITTING DEVICE AND DISPLAY DEVICE

(75) Inventor: Shigenori Tanaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 23 days.

(21) Appl. No.: 13/805,062

(22) PCT Filed: May 19, 2011

(86) PCT No.: PCT/JP2011/061529
§ 371 (c)(1),
(2), (4) Date: Dec. 18, 2012

(87) PCT Pub. No.: WO2012/008220
PCT Pub. Date: Jan. 19, 2012

(65) Prior Publication Data
US 2013/0088892 A1   Apr. 11, 2013

(30) Foreign Application Priority Data
Jul. 12, 2010 (JP) ................................. 2010-157772

(51) Int. Cl.
*F21V 7/04* (2006.01)
(52) U.S. Cl.
CPC ............ *G02B 6/0073* (2013.01); *G02B 6/0081* (2013.01)
USPC ............. 362/613; 362/611; 362/616; 349/61; 349/65
(58) Field of Classification Search
USPC ............... 362/611–613, 615, 616; 349/61, 65
See application file for complete search history.

(56) References Cited

U.S. PATENT DOCUMENTS

| | | | | |
|---|---|---|---|---|
| 6,746,129 | B2 * | 6/2004 | Ohkawa | 362/625 |
| 7,165,856 | B2 * | 1/2007 | Tseng et al. | 362/26 |
| 7,658,530 | B2 * | 2/2010 | Liu | 362/606 |
| 8,596,850 | B2 * | 12/2013 | Hirohata et al. | 362/612 |
| 2004/0223314 | A1 | 11/2004 | Ching-Huang et al. | |
| 2007/0247871 | A1 * | 10/2007 | Yoo | 362/612 |
| 2008/0137374 | A1 | 6/2008 | Kim et al. | |
| 2008/0175023 | A1 | 7/2008 | Lee et al. | |
| 2011/0187636 | A1 * | 8/2011 | Suzuki | 345/102 |

FOREIGN PATENT DOCUMENTS

| | | |
|---|---|---|
| JP | 2003-109421 A | 4/2003 |
| JP | 2004-214204 A | 7/2004 |
| JP | 2008-147186 A | 6/2008 |
| JP | 2008-177170 A | 7/2008 |
| JP | 2009-080953 A | 4/2009 |

OTHER PUBLICATIONS

Official Communication issued in International Patent Application No. PCT/JP2011/061529, mailed on Aug. 23, 2011.

* cited by examiner

*Primary Examiner* — Ali Alavi
(74) *Attorney, Agent, or Firm* — Keating & Bennett, LLP (57) ABSTRACT

A surface light-emitting device (1) of the present invention includes: first light sources (2a) emitting light in one direction, a second light source (2b) emitting light in a direction orthogonal to the direction, a first light guide plate (3), and a second light guide plate (4). The plate (3) has a light-incident end surface (6) on which light emitted from the light sources (2a) is incident, at least one light-incident end surface (8) on which light emitted from the light source (2b) is incident, and a light-emitting end surface (7) which is opposite to the surface (6) and from which light entering the plate (3) is emitted. The plate (4) includes a counter end surface (9) opposite to surface (7), and carries out, from its main surface, surface-emitting of light entering the plate (4) via the surface (9).

5 Claims, 5 Drawing Sheets

SURFACE LIGHT-EMITTING DEVICE AND DISPLAY DEVICE

TECHNICAL FIELD

The present invention relates to a surface light-emitting device of a side light type and a display device including the surface light-emitting device.

BACKGROUND ART

Cathode ray tube (CRT) display devices have been rapidly replaced with liquid crystal display devices. A liquid crystal display device has features of energy saving, a flat body, and a lightweight body, for example. For this reason, the liquid crystal display device has been widely applied to a liquid crystal television, a monitor, a mobile phone, and the like. In order to further take advantage of such features of a liquid crystal display device, there may be proposed an improvement of an illumination device (what is called a backlight) which is provided on a backside of a liquid crystal display device.

A backlight is roughly classified into a side light type (also referred to as "edge light type") and a direct type. A backlight of the side light type has an arrangement in which (i) a light guide plate is provided on a backside of a liquid crystal display panel, and (ii) a light source is provided at a side end part of the light guide plate. Light emitted from the light source is reflected in the light guide plate, and then is emitted from an upper surface of the light guide plate, so that a surface of the liquid crystal display panel is irradiated with the light uniformly. With the arrangement, it is possible to cause an illumination device (i) to have a thin body and (ii) to be excellent in luminance uniformity. For the reasons described above, the backlight of the side light type has been mainly used in a small and medium sized liquid crystal display devices, such as a mobile phone, and a laptop computer.

Patent Literature 1 describes an example of the backlight of the side light type. Patent Literature 1 describes a backlight having an arrangement in which (i) a buffer plate is provided between a light source and a light guide plate, and (ii) both the light guide plate and the buffer plate have a prism shape. This backlight takes advantage of (i) a refractive index of the light that is emitted from the light source and is emitted from the buffer plate and (ii) a refractive index of the light entering the light guide plate. With the arrangement, the backlight has an improvement in uniformity of light emitted from the light guide plate.

CITATION LIST

Patent Literature 1

Japanese Patent Application Publication, Tokukai, No. 2008-147186 A (Publication Date: Jun. 26, 2008)

SUMMARY OF INVENTION

Technical Problem

Figure 8:
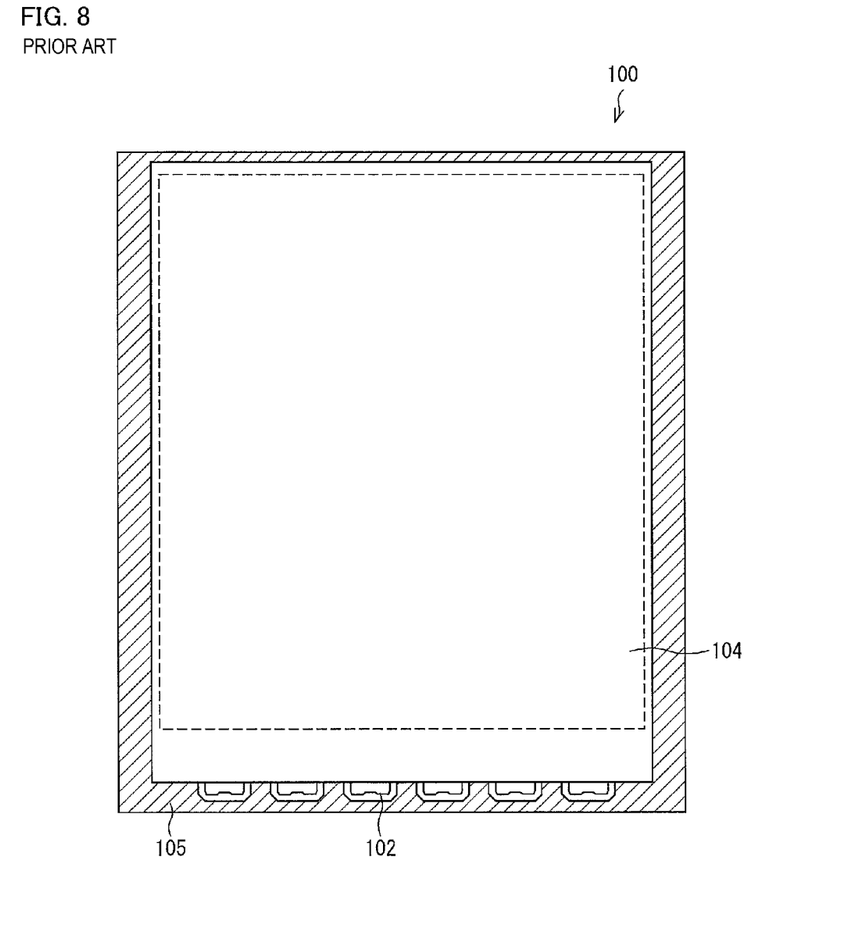
FIG. 8 is a top view schematically illustrating an arrangement of a conventional surface light-emitting device.
Figure 9:
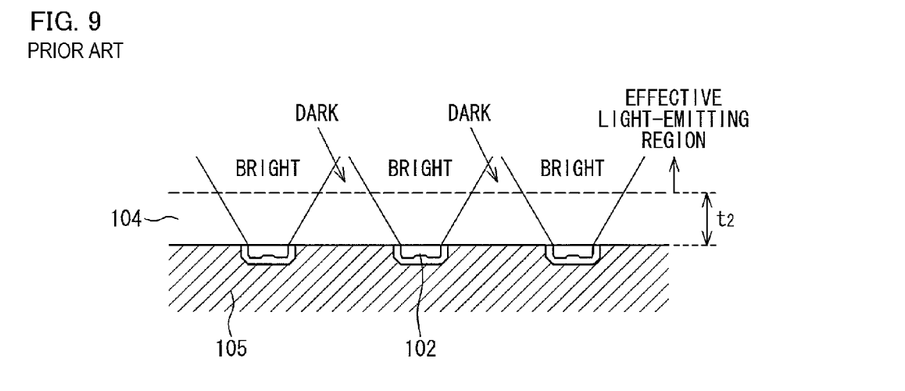
FIG. 9 is an enlarged top view illustrating, for an explanation of a problem of a conventional surface light-emitting device, an end part of a light guide plate.

The following description discusses problems of the backlight of the side light type, included in a conventional liquid crystal display device, with reference to FIGS. 8 and 9. FIG. 8 is a top view illustrating a conventional backlight 100 of the side light type. FIG. 9 is an enlarged top view illustrating an end part of a light guide plate 104 illustrated in FIG. 8.

As illustrated in FIG. 8, a plurality of LEDs 102, which are point light sources, are provided, in a line, on a side surface of the light guide plate 104. Light emitted from the plurality of LEDs 102 is incident on a light incident surface of the light guide plate. The light which has entered the light guide plate is reflected from a bottom surface of the light guide plate. That is, the light guide plate serves as a surface light source, and emits light toward a liquid crystal display panel (not illustrated).

Each of the plurality of LEDs 102 emits light in a certain range of a light-emitting angle. Accordingly, in a case where the light guide plate is used as a surface light source, it is necessary to secure a certain distance between each of the plurality of LEDs 102 and the bottom surface of the light guide plate. For this reason, the light guide plate 104 has an arrangement in which an end part in the vicinity of each of the plurality of LEDs 102 is shielded to be an ineffective region, and an inner region (an inner region with respect to a dashed line in FIGS. 8 and 9) with respect to such an end part is used as an effective light-emitting region.

However, as illustrated in FIG. 9, even in a case where the distance necessary for conversion of the light is secured by use of such an ineffective region, there might be a case where the effective light-emitting region has a region which the light emitted from the plurality of LEDs 102 does not reach. That is, since each of the plurality of LEDs 102 emits light in the certain range of a light-emitting angle, there might be a case where a dark part generated between adjacent ones of the plurality of LEDs 102 has an influence on the effective light-emitting region. In this case, there is nonuniformity of luminance in the light emitted from the backlight 100.

A size of the dark part between adjacent ones of the plurality of LEDs 102 depends on an LED pitch. The greater the LED pitch is, the larger the dark section becomes. In order to solve the problem described above there is a method in which (i) the number of LEDs 102 is increased to cause the LED pitch to be smaller, and therefore (ii) the region which the light does not reach is eliminated and the nonuniformity of luminance is reduced. However, in view of demand for an energy saving property in recent years, since an increase in the number of the LEDs 102 provided in the backlight 100 leads to an increase in power consumption, it is not preferable to have an increase in the number of LEDs 102.

Further, the backlight described in Patent Literature 1 has the arrangement in which (i) both the light guide plate and the buffer plate have a prism shape, and therefore (ii) uniformity of the light emitted from the light guide plate is improved. However, this method requires a process and a cost for processing these members to have a prism shape. Furthermore, Patent Literature 1 only deals with a reduction in luminance nonuniformity in terms of reflection of light. That is, Patent Literature 1 does not take into consideration of nonuniformity of luminance due to the LED pitch.

The present invention is made in view of the problems described above. An object of the present invention is to provide (i) a surface light-emitting device having a simple arrangement as compared with a conventional surface light-emitting device, which surface light-emitting device can carry out surface-emitting by use of light that is improved in uniformity, without an increase in the number of light sources, and (ii) a display device including the surface light-emitting device.

Solution to Problem

In order to attain the object, a surface light-emitting device includes: at lease one first light source; at least one second light source that emits light in a direction different from a direction in which the first light source emits light; a first light guide plate having (i) a first light-incident end surface on which the light emitted from the at least one first light source is incident, (ii) at least one second light-incident end surface on which the light emitted from the at least one second light source is incident, and (iii) a light-emitting end surface which is located in a position opposite to a position of the first light-incident end surface, and from which light that enters the first light guide plate is emitted; and a second light guide plate that (i) has a counter end surface positioned to face the light-emitting end surface, and (ii) carries out, from one of main surfaces of the second light guide plate, surface-emitting of light that enters the second light guide plate via the counter end surface.

In the arrangement described above, the light emitted from the at least one first light source enters the first light guide plate via the first light-incident end surface. Among the light which has been emitted from the at least one first light source and has entered the first light guide plate, (i) a component of the light, perpendicular to the light-emitting end surface, is emitted from the light-emitting end surface, and (ii) the other components of the light, having angles with respect to the light-emitting end surface, are reflected inside the first light guide plate, and then are emitted from the light-emitting end surface.

Further, the light emitted form the at least one second light source enters the first light guide plate via the at least one second light-incident end surface. The light that has been emitted from the at least one second light source and has entered the first light guide plate travels in the first light guide plate while being reflected inside the first light guide plate. After traveling inside the first light guide plate, the light is emitted from the light-emitting end surface.

According to the arrangement described above, light enters the first light guide plate in at least two directions, and then is reflected inside the first light guide plate, after that, is emitted from the first light guide plate. For this reason, the light emitted from the first light guide plate has been improved in uniformity. The light enters the second light guide plate via the counter end surface, and then is subjected to surface-emitting from one of main surfaces of the second light guide plate. Here, the light which has entered the second light guide plate is capable of reaching a region which is not in a range of a light-emitting angle of the light emitted from the at least one first light source. Because of this, even in a case where a pitch at which a plurality of first light sources are arranged is large, it is possible to prevent, in an effective light-emitting region of the second light guide plate, generation of a region which light does not reach.

Accordingly, the surface light-emitting device of the present invention can carry out, with a simple arrangement and without an increase in the number of light sources, surface-emitting of light which has been improved in uniformity.

Additional objects, features, and strengths of the present invention will be made clear sufficiently by the description below. Further, the advantages of the present invention will be evident from the following explanation in reference to the drawings.

Advantageous Effects of Invention

A surface light-emitting device includes: at lease one first light source; at least one second light source that emits light in a direction different from a direction in which the first light source emits light; a first light guide plate having (i) a first light-incident end surface on which the light emitted from the at least one first light source is incident, (ii) at least one second light-incident end surface on which the light emitted from the at least one second light source is incident, and (iii) a light-emitting end surface which is located in a position opposite to a position of the first light-incident end surface, and from which light that enters the first light guide plate is emitted; and a second light guide plate that (i) has a counter end surface positioned to face the light-emitting end surface, and (ii) carries out, from one of main surfaces of the second light guide plate, surface-emitting of light that enters the second light guide plate via the counter end surface.

DESCRIPTION OF EMBODIMENTS

An embodiment of a surface light-emitting device of the present invention is described below with reference to drawings. Note however that the present invention is not limited to the following embodiment.

(Configuration of Surface Light-Emitting Device 1)

Figure 1:
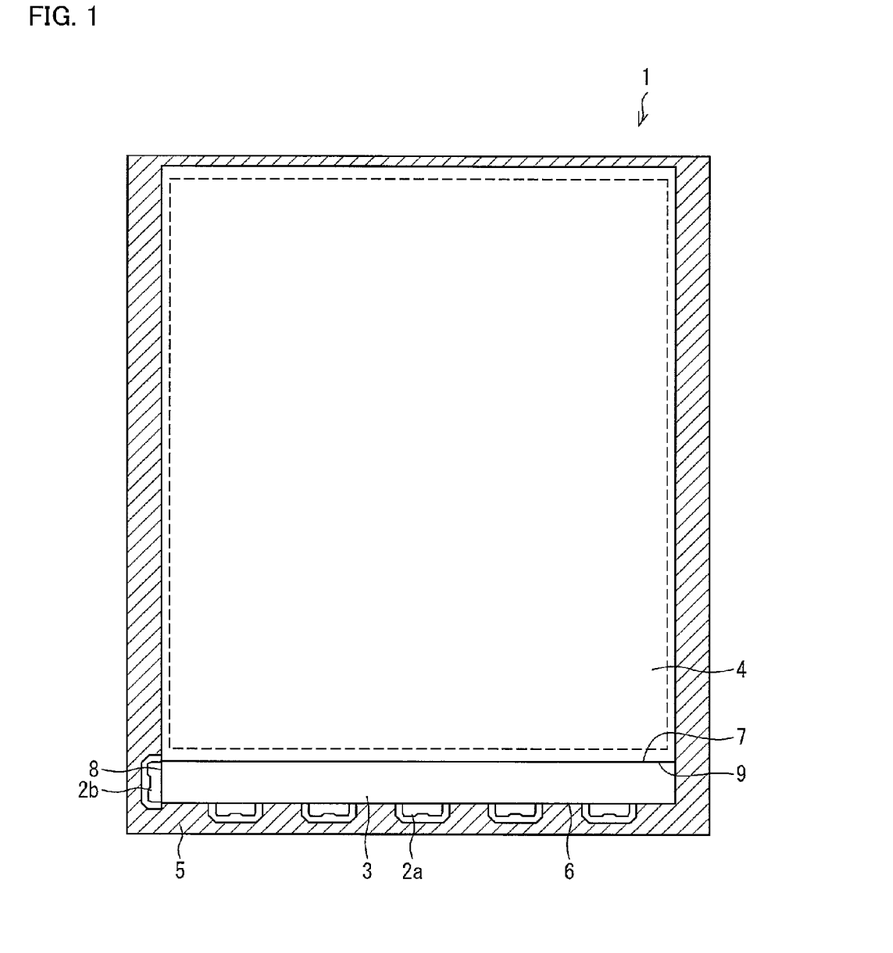
FIG. 1 is a top view schematically illustrating an arrangement of a surface light-emitting device in accordance with an embodiment of the present invention.

First, the following description deals with an outline of an arrangement of a surface light-emitting device 1 of the present embodiment with reference to FIG. 1. FIG. 1 is a top view schematically illustrating the arrangement of the surface light-emitting device 1 of the present embodiment.

The surface light-emitting device 1 of the present embodiment can be realized, for example, as a backlight provided on a back surface of a display panel of a display device.

The surface light-emitting device 1 is a surface light-emitting device of a side light type, and includes a plurality of first light sources 2a, a second light source 2b, a first light guide plate 3, a second light guide plate 4, a frame 5, and the like (see FIG. 1).

Each of the plurality of first light sources 2a is a point light source, and the second light source 2b is also a point light source. Each of the plurality of first light sources 2a may be a light-emitting diode. The second light source 2b may be also a light-emitting diode. The plurality of first light sources 2a are arranged along a longitudinal side of a light-incident end surface 6 of the first light guide plate 3. The second light source 2b is arranged on a light-incident end surface 8 of the first light guide plate 3. Light emitted from the plurality of first light sources 2a and light emitted from the second light source 2b enter the second light guide plate 4 via the first light guide plate 3. Details of such light are described later.

The first light guide plate 3 is a transparent member having a long and thin plate shape. The first light guide plate 3 is arranged so that one of end surfaces of the first light guide plate 3 faces a predetermined one of end surfaces of the second light guide plate 4. The first light guide plate 3 has the light-incident end surface (first light-incident end surface) 6 on which light emitted from the plurality of first light sources 2a is incident, and the light-incident end surface (second light-incident end surface) 8 on which light emitted from the second light source 2b is incident. Further, the first light guide plate 3 is arranged such that (i) the one of end surfaces, facing the predetermined one of end surfaces of the second light guide plate 4, serves as a light-emitting end surface 7, and (ii) light entering the first light guide plate 3 via the light-incident end surfaces 6 and 8 is emitted from the light-emitting end surface 7. That is, the first light guide plate 3 has a function of converting point light sources (i.e., the plurality of first light sources 2a and the second light source 2b) into a linear light source. Note that, the light-incident end surfaces 6 and 8 are orthogonal to each other. Further, a position of the light-incident end surface 6 and a position of the light-emitting end surface 7 are opposite to each other.

The second light guide plate 4 is a transparent member having a long and thin plate shape, and has a counter end surface 9 which faces the light-emitting end surface 7 of the first light guide plate 3. The second light guide plate 4 receives light incident on the counter end surface 9, and carries out surface-emitting from one of its main surfaces. That is, the second light guide plate 4 has a function of converting the linear light source generated by the first light guide plate 3 into a surface light source. For example, in a case where the surface light-emitting device 1 is used in a liquid crystal display device, the second light guide plate 4 is arranged on a back surface of a liquid crystal display panel to irradiate the liquid crystal display panel with light.

Note that, a region surrounded by a dashed line in FIG. 1 indicates an effective light-emitting region in the second light guide plate 4, and a region outside the dashed line indicates an ineffective region of the second light guide plate 4.

In the frame 5, the plurality of first light sources 2a, the second light source 2b, the first light guide plate 3, the second light guide plate 4, and other members are provided. These members are stored in the frame 5 to be integral with the frame 5.

Further, in the present embodiment, the frame 5 forms an interface between the frame 5 and the first light guide plate 3 so that light entering the first light guide plate 3 can be reflected from the interface and then is emitted from the light-emitting end surface 7. For this reason, it is preferable that the frame 5 is made from a material having a high reflectivity.

[Uniformity in Luminance in Surface Light-Emitting Device 1]

Next, details of uniformity in luminance in the surface light-emitting device 1 are described below with reference to FIG. 1.

In the surface light-emitting device 1 of the present embodiment, a direction in which the light emitted from the plurality of first light sources 2a is incident on the first light guide plate 3 and a direction in which the light emitted from the second light source 2b is incident on the first light guide plate 3 are different from each other. Note that, a direction in which light is incident on the first light guide plate 3 means a direction of a peak of the light incident on the first light guide plate 3.

Specifically, each of the plurality of first light sources 2a emits light toward the light-incident end surface 6 (see FIG. 1). A part of the light that is emitted from each of the plurality of light sources 2a and enters the first light guide plate 3 via the light-incident end surface 6 travels straight, and another part of the light is reflected inside the first light guide plate 3 and is emitted from the light-emitting end surface 7.

On the other hand, the second light source 2b emits light toward the light-incident end surface 8. The light that is emitted from the second light source 2b and enters the first light guide plate 3 via the light-incident end surface 8 (i) travels inside the first light guide plate 3 while being reflected and (ii) is emitted from the light-emitting end surface 7 after traveling inside the light guide plate 3.

Note that, in the present embodiment, the direction in which the light emitted from the plurality of first light sources 2a is incident on the first light guide plate 3 and the direction in which the light emitted from the second light source 2b is incident on the first light guide plate 3 are orthogonal to each other. The plurality of first light sources 2a can suitably cause the light to enter the light guide plate 3 via the light-incident end surface 6, and the second light source 2b can suitably cause the light to enter the light guide plate 3 via the light-incident end surface 8.

As described above, the first light guide plate 3 is irradiated with not only the light emitted from the plurality of first light sources 2a but also the light emitted from the second light source 2b. That is, the first light guide plate 3 is irradiated (i) with light in one direction and (ii) with light in another direction. The light emitted from each of these directions enters the first light guide plate 3, and then is reflected inside the first light guide plate 3, after that, is emitted from the first light guide plate 3. For this reason, the light finally emitted from the first light guide plate 3 has been improved in uniformity.

The light emitted from the first light guide plate 3 enters the second light guide plate 4 via the counter end surface 9, and then is emitted from an entire plane of one of main surfaces of the second light guide plate 4. Here, since the light emitted form the first light guide plate 3 has been improved in uniformity, a sufficient amount of the light can reach the region corresponding to a space between adjacent ones of the plurality of first light sources 2a. With the arrangement, it is possible to (i) reduce, in the second light guide plate 4 a region, which light does not reach and (ii) reduce nonuniformity in luminance as compared with a conventional arrangement.

Further, in the present embodiment, it is possible to arrange the plurality of first light sources 2a at a pitch that is greater than a pitch at which a plurality of light sources are arranged in a conventional arrangement. Accordingly, in a case where a size of an outer shape of the surface light-emitting device 1 of the present invention is set to be the same as that of a conventional surface light-emitting device, it is possible to (i) reduce the number of the plurality of first light sources 2a, as compared with the number of first light sources 2a used in the conventional light-emitting device, and (ii) provide, as a light source(s) 2b, first light source(s) 2a the number of which is identical with the number of the first light source(s) thus reduced.

For example, in an example of a conventional surface light-emitting device illustrated in FIG. 8, six LEDs 102 are arranged on a light-incident surface. On the other hand, in the present embodiment, as illustrated in FIG. 1, five first light sources 2a are arranged on the light-incident end surface 6, and one second light source 2b (another first light source 2a) is arranged on the light-incident end surface 8.

Accordingly, with the surface light-emitting device 1 of the present embodiment, it is unnecessary to increase the number of light sources, as compared with a conventional arrangement. That is, it is possible to reduce nonuniformity in luminance without an increase in power consumption.

The number of first light sources 2a illustrated in FIG. 1 is merely an example, and is not particularly limited as long as the number of first light sources 2a is not less than one.

(Size of First Light Guide Plate 3)

Figure 2:
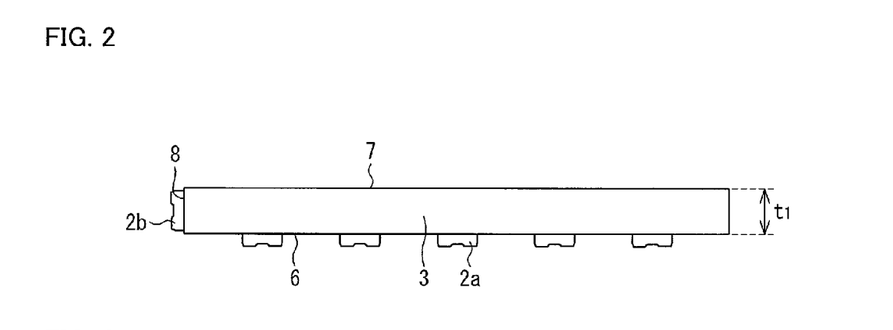
FIG. 2 is a top view illustrating a first light guide plate of the surface light-emitting device illustrated in FIG. 1.
Figure 3:
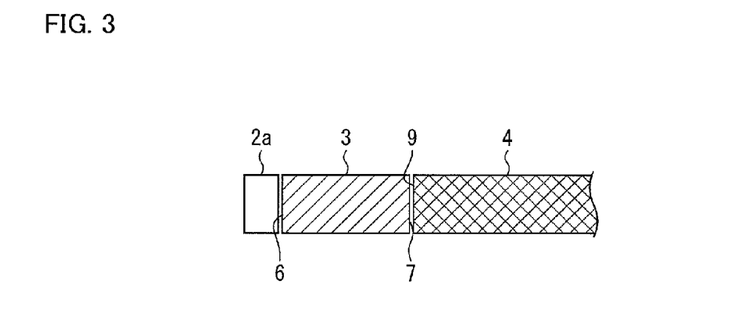
FIG. 3 is a cross-sectional view partially illustrating (i) the first light guide plate of the surface light-emitting device illustrated in FIG. 1 and (ii) a part in the vicinity of the first light guide plate.

The following description deals with a size of the first light guide plate 3 with reference to FIGS. 2 and 3. FIG. 2 is a top view illustrating the first light guide plate 3. FIG. 3 is a cross-sectional view illustrating (i) the first light guide plate 3 and (ii) members provided in the vicinity of the first light guide plate 3.

As illustrated in FIG. 2, it is necessary that a length t1 of the first light guide plate 3 in a direction perpendicular to the light-emitting end surface 7 of the first light guide plate 3 is at least not less than a size of the second light source 2b. For example, an LED may be used as the second light source 2b. An LED generally has a size of almost 4 mm. Therefore, it is possible to cause the first light guide plate 3 to have a length t1 of almost 4 mm.

On the other hand, in the conventional surface light-emitting device, as described in the background art, a distance from a light source to a point where light emitted from the light source is directed toward a light-emitting surface is a length t2, which is a length of an ineffective region (see FIG. 9). Generally, the length t2 of the ineffective region is approximately 4 mm.

Accordingly, it is possible to provide the first light guide 3 in a range which corresponds to the ineffective region in the conventional surface light-emitting device. Therefore, the surface light-emitting device 1 of the present embodiment can be arranged such that (i) a light-emitting effective region of the second light guide plate 4 is identical in size with that of the conventional surface light-emitting device, and (ii) an outer shape of the surface light-emitting device 1 is identical in size with that of the conventional surface light-emitting device.

It is most preferable that there is no space between the first light guide plate 3 and the second light guide plate 4, as illustrated in FIG. 3. It is preferable that a distance between the light guide plate 3 and the second light guide plate 4 is not more than 0.1 mm. This also applies to (i) a space between the plurality of first light sources 2a and the first light guide plate 3, and (ii) a space between the second light source 2b and the first light guide plate 3.

[Display Device]

A display device of the present invention can be constituted by a combination of the surface light-emitting device 1 and a display panel. That is, by providing the surface light-emitting device 1 on a back surface of the display panel, it is possible to realize the display device of the present invention, which display device employs the surface light-emitting device 1 as a backlight. With the arrangement, it is possible for the display device of the present invention to use light which has been improved in uniformity.

According to one embodiment of the present invention, the display panel is a liquid crystal display panel. In this case, the display device is a liquid crystal display device. Note, however, that the display device of the present invention is not limited to the liquid crystal display device, and can be realized, in accordance with any of various embodiments, as another display device including the surface light-emitting device as a backlight.

MODIFIED EXAMPLES

The following description deals with a modified example of the present embodiment.

It is possible that the light-incident surface of the first light guide plate 3 has a shape having a reflection angle (i.e., a convex-concave shape) so as to reflect light which has entered the first light guide plate 3. With the arrangement, the light which has entered the first light guide plate 3 is reflected not only from an interface between the first light guide 3 and the frame 5 but also from the light-incident end surface 6 suitably. It is therefore possible to emit, from the light-emitting end surface 7, light that has been further improved in uniformity.

Figure 4:
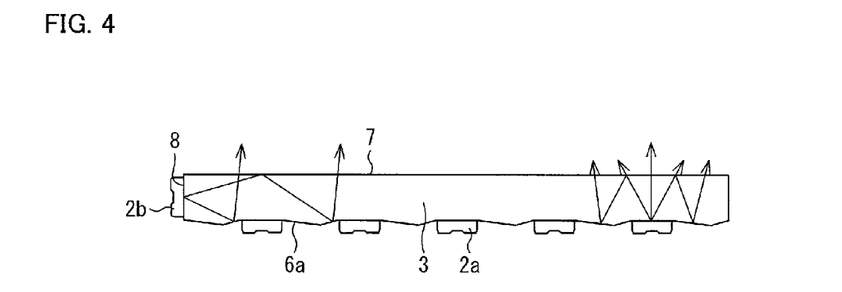
FIG. 4 is a top view illustrating a modified example of the first light guide plate illustrated in FIG. 2.
Figure 5:
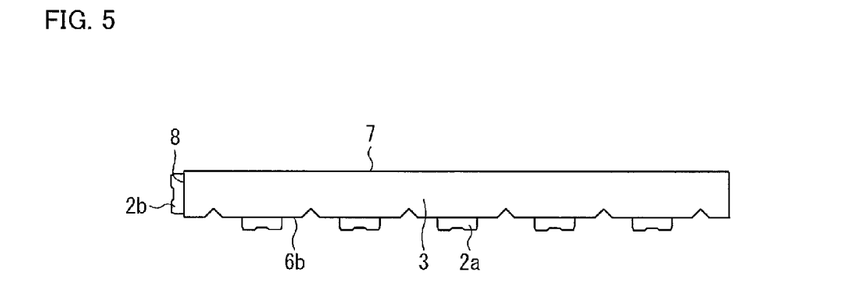
FIG. 5 is a top view illustrating another modified example of the first light guide plate illustrated in FIG. 2.

For example, it is possible that the first light guide plate 3 can have such a light-incident end surface 6a that a part corresponding to a space between adjacent ones of the plurality of first light sources 2a has a convex shape (see FIG. 4). Further, the first light guide plate 3 can have such a light-incident end surface 6b that a part corresponding to a space between adjacent ones of the plurality of first light sources 2a has a V-shaped groove (see FIG. 5). FIGS. 4 and 5 are top views illustrating first light guide plates 3 of modified examples, respectively.

Figure 6:
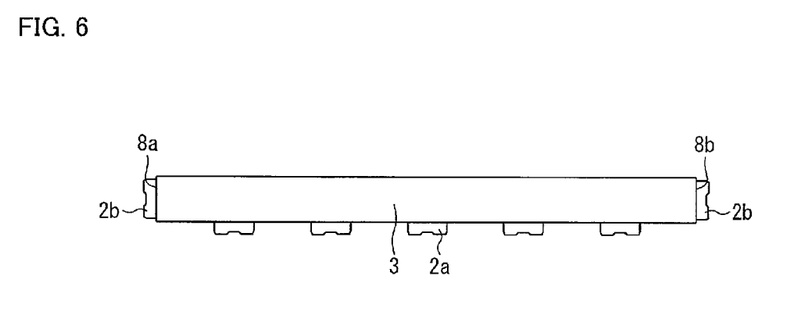
FIG. 6 is a top view illustrating a modified example of an arrangement of light sources in the surface light-emitting device illustrated in FIG. 1.

Further, the first light guide plate 3 can have two light-incident end surfaces 8a and 8b. That is, it is possible that the light guide plate 3 has the light-incident end surfaces 8a and 8b, and two second light sources 2b are provided on the light-incident end surfaces 8a and 8b, respectively (see FIG. 6). FIG. 6 is a top view illustrating an arrangement of the second light sources 2b on the first light guide plate 3. In FIG. 6, (i) the two light-incident end surfaces 8a and 8b are provided to face each other, and (ii) the two second light sources 2b are provided to face each other.

Figure 7:
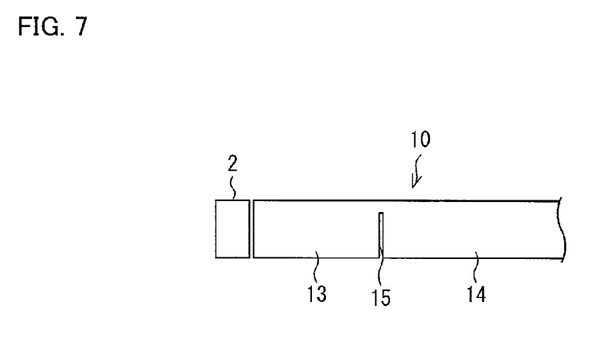
FIG. 7 is a cross-sectional view partially illustrating a modified example of the surface light-emitting device illustrated in FIG. 1.

Further, the first light guide plate 3 can be formed integral with the second light guide plate 4. For example, it is possible that (i) one light guide plate 10 has a slit 15 so as to have a first light guide section 13 and a second light guide section 14 between which the slit 15 serves as a boundary, and (ii) the first light guide section 13 serves as the first light guide plate 3 and the second light guide section 14 serves as the second light guide plate 4 (see FIG. 7). FIG. 7 is a cross-sectional view partially illustrating the first light guide section 13 and the second light guide section 14.

In the present embodiment, the direction in which the light emitted from the plurality of first light sources 2a is incident on the first light guide 3 and the direction in which the light emitted from the second light source(s) 2b is incident on the first light guide 3 are orthogonal to each other. Note, however, that the present invention is not limited to this, and it is possible to have effects of the present invention as long as the direction in which the light emitted from the plurality of light sources 2a is incident on the light guide 3 and the direction in which the light emitted from the light source(s) 2b is incident on the light guide 3 are different from each other.

The present invention is not limited to the description of the embodiments above, but may be altered by a skilled person within the scope of the claims. An embodiment based on a proper combination of technical means disclosed in different embodiments is encompassed in the technical scope of the present invention. The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

[Conclusion of the Present Invention]

In order to attain the object, a surface light-emitting device of the present invention includes: at lease one first light source; at least one second light source that emits light in a direction different from a direction in which the first light source emits light; a first light guide plate having (i) a first light-incident end surface on which the light emitted from the at least one first light source is incident, (ii) at least one second light-incident end surface on which the light emitted from the at least one second light source is incident, and (iii) a light-emitting end surface which is located in a position opposite to a position of the first light-incident end surface, and from which light that enters the first light guide plate is emitted; and a second light guide plate that (i) has a counter end surface positioned to face the light-emitting end surface, and (ii) carries out, from one of main surfaces of the second light guide plate, surface-emitting of light that enters the second light guide plate via the counter end surface.

In the arrangement described above, the light emitted from the at least one first light source enters the first light guide plate via the first light-incident end surface. Among the light which has been emitted from the at least one first light source and has entered the first light guide plate, (i) a component of the light, perpendicular to the light-emitting end surface, is emitted from the light-emitting end surface, and (ii) the other components of the light, having angles with respect to the light-emitting end surface, are reflected inside the first light guide plate, and then are emitted from the light-emitting end surface.

Further, the light emitted form the at least one second light source enters the first light guide plate via the at least one second light-incident end surface. The light that has been emitted from the at least one second light source and has entered the first light guide plate travels in the first light guide plate while being reflected inside the first light guide plate. After traveling inside the first light guide plate, the light is emitted from the light-emitting end surface.

According to the arrangement described above, light enters the first light guide plate in at least two directions, and then is reflected inside the first light guide plate, after that, is emitted from the first light guide plate. For this reason, the light emitted from the first light guide plate has been improved in uniformity. The light enters the second light guide plate via the counter end surface, and then is subjected to surface-emitting from one of main surfaces of the second light guide plate. Here, the light which has entered the second light guide plate is capable of reaching a region which is not in a range of a light-emitting angle of the light emitted from the at least one first light source. Because of this, even in a case where a pitch at which a plurality of first light sources are arranged is large, it is possible to prevent, in an effective light-emitting region of the second light guide plate, generation of a region which light does not reach.

Accordingly, the surface light-emitting device of the present invention can carry out, with a simple arrangement and without an increase in the number of light sources, surface-emitting of light which has been improved in uniformity.

Further, the surface light-emitting device of the present invention is preferably such that the at least one second light source is a plurality of second light sources; the plurality of second light sources are provided so that one(s) of the plurality of second light sources and the other one(s) of the plurality of second light sources face each other; the at least one second light-incident end surface of the first light guide plate is two second light-incident end surfaces facing each other; and light emitted from the one(s) of the plurality of second light sources is incident on one of the two second light-incident end surfaces and light emitted from the other one(s) of the plurality of second light sources is incident on the other one of the two second light-incident end surfaces.

According to the arrangement described above, light enters the first light guide plate not only via the first light-incident edge surface but also via the two second light-incident end surfaces positioned opposite to each other. Accordingly, it is possible to further improve, in uniformity, the light emitted from the light-emitting end surface.

Furthermore, the surface light-emitting device of the present invention is preferably such that the at least one first light source is a plurality of first light sources; and a part of the first light-incident end surface, which part corresponds to a space between adjacent ones of the plurality of first light sources, has a convex-concave shape.

According to the arrangement described above, it is possible to (i) prevent a case where the light emitted from the at least one first light source cannot successfully enter the second light guide plate via the first light-incident end surface of the first light guide plate, and therefore (ii) cause the light to be reflected inside the second light guide plate more successfully.

Moreover, the surface light-emitting device of the present invention is preferably such that the at least one first light source is a light-emitting diode and the at least one second light source is a light-emitting diode; and a width of the first light guide plate in a direction perpendicular to the light-emitting end surface and a width of the at least one second light source are identical with each other.

According to the arrangement described above, the surface light-emitting device of the present invention is capable of carrying out surface-emitting of light which has been improved in uniformity, while having the same size of an outer appearance as that of an outer appearance of a conventional arrangement.

Further, the surface light-emitting device of the present invention is such that the first light guide plate and the second light guide plate are formed integral with each other to provide a single light guide plate; and the single light guide plate has a slit between a part which serves as the first light guide plate and a part which serves as the second light guide plate.

According to the arrangement described above, it is possible to prepare the first light guide plate and the second light guide plate in a simple manner as compared with a conventional arrangement.

A display device of the present invention includes: a display panel; and a surface light-emitting device according to any one of the surface light-emitting devices described above, the surface light-emitting device being provided on a back surface of the display panel.

According to the arrangement described above, it is possible to provide a display device including a surface light-emitting device which can carry out surface-emitting of light which has been improved in uniformity.

INDUSTRIAL APPLICABILITY

The present invention can be suitably used as, for example, a backlight of a liquid crystal display device.

REFERENCE SIGNS LIST

1: Surface light-emitting device
2a: First light source

2b: Second light source
3: First light guide plate
4: Second light guide plate
5: Frame
6, 6a, 6b: Light incident end surface
7: Light-emitting end surface
8, 8a, 8b: Light-incident end surface
9: Counter end surface
10: Light guide plate
13: First light guide section
14: Second light guide section
15: Slit

The invention claimed is:

1. A surface light-emitting device, comprising:
   at lease one first light source;
   at least one second light source that emits light in a direction different from a direction in which the first light source emits light;
   a first light guide plate having (i) a first light-incident end surface on which the light emitted from the at least one first light source is incident, (ii) at least one second light-incident end surface on which the light emitted from the at least one second light source is incident, and (iii) a light-emitting end surface which is located in a position opposite to a position of the first light-incident end surface, and from which light that enters the first light guide plate is emitted; and
   a second light guide plate that (i) has a counter end surface positioned to face the light-emitting end surface, and (ii) carries out, from one of main surfaces of the second light guide plate, surface-emitting of light that enters the second light guide plate via the counter end surface; wherein
   the first light guide plate and the second light guide plate are formed integral with each other to provide a single light guide plate; and
   the single light guide plate has a slit between a part which serves as the first light guide plate and a part which serves as the second light guide plate.

2. The surface light-emitting device according to claim 1, wherein:
   the at least one second light source is a plurality of second light sources;
   the plurality of second light sources are provided so that one(s) of the plurality of second light sources and the other one(s) of the plurality of second light sources face each other;
   the at least one second light-incident end surface of the first light guide plate is two second light-incident end surfaces facing each other; and
   light emitted from the one(s) of the plurality of second light sources is incident on one of the two second light-incident end surfaces and light emitted from the other one(s) of the plurality of second light sources is incident on the other one of the two second light-incident end surfaces.

3. The surface light-emitting device according to claim 1, wherein:
   the at least one first light source is a plurality of first light sources; and
   a part of the first light-incident end surface, which part corresponds to a space between adjacent ones of the plurality of first light sources, has a convex-concave shape.

4. The surface light-emitting device according to claim 1, wherein:
   the at least one first light source is a light-emitting diode and the at least one second light source is a light-emitting diode; and
   a width of the first light guide plate in a direction perpendicular to the light-emitting end surface and a width of the at least one second light source are identical with each other.

5. A display device, comprising:
   a display panel; and
   a surface light-emitting device recited in claim 1,
   the surface light-emitting device being provided on a back surface of the display panel.

* * * * *